United States Patent [19]
Rossignac

[11] Patent Number: 5,872,572
[45] Date of Patent: Feb. 16, 1999

[54] METHOD AND APPARATUS FOR GENERATING NON-UNIFORM RESOLUTION IMAGE DATA

[75] Inventor: Jaroslaw Roman Rossignac, Croton on Hudson, N.Y.

[73] Assignee: International Business Machines Corporation, Armonk, N.Y.

[21] Appl. No.: 587,611

[22] Filed: Jan. 17, 1996

Related U.S. Application Data

[60] Provisional application No. 60/008,414, Dec. 8, 1995.

[51] Int. Cl.$^6$ .................................................. G06T 11/00
[52] U.S. Cl. .......................................................... 345/428
[58] Field of Search .................................. 395/128, 508; 348/420; 364/514 A; 345/132, 428, 508, 8

[56] References Cited

U.S. PATENT DOCUMENTS

| | | | |
|---|---|---|---|
| 4,494,144 | 1/1985 | Brown | 348/420 |
| 4,598,372 | 7/1986 | McRoberts | 364/514 A |
| 4,633,296 | 12/1986 | Cham et al. | 358/12 |
| 4,650,929 | 3/1987 | Boerger et al. | 358/86 |
| 4,651,206 | 3/1987 | Ohki | 358/136 |
| 4,656,511 | 4/1987 | Koga | 358/136 |
| 4,663,660 | 5/1987 | Fedele et al. | 358/133 |
| 4,686,698 | 8/1987 | Tompkins et al. | 379/53 |
| 4,695,883 | 9/1987 | Chandler et al. | 358/138 |
| 4,703,350 | 10/1987 | Hinman | 358/133 |
| 4,710,917 | 12/1987 | Tompkins et al. | 370/62 |
| 4,717,956 | 1/1988 | Moorhead et al. | 358/135 |
| 4,935,953 | 6/1990 | Appel et al. | 379/53 |
| 5,065,346 | 11/1991 | Kawai et al. | 395/128 |
| 5,179,639 | 1/1993 | Taaffe | 395/128 |
| 5,239,625 | 8/1993 | Bogart et al. | 395/128 |
| 5,263,136 | 11/1993 | DeAguiar et al. | 395/508 X |
| 5,320,534 | 6/1994 | Thomas | 434/44 |
| 5,414,469 | 5/1995 | Gonzales et al. | 348/408 |
| 5,448,686 | 9/1995 | Borrel et al. | 395/128 X |
| 5,621,429 | 4/1997 | Yamaashi et al. | 395/128 X |

FOREIGN PATENT DOCUMENTS

WO86/04757  8/1986  WIPO ........................... H04N 7/137

OTHER PUBLICATIONS

L. Williams, "Pyramidal Parametrics", Computer Graphics Jul. 1983 V17 #3 pp. 1–11.

Foley et al, "Image Manipulation and Storage", Computer Graphics Principles and Practice 2nd Ed. Addison–Wesley Publ. Co. pp. 815–826.

*Primary Examiner*—Mark K. Zimmerman
*Attorney, Agent, or Firm*—Jay P. Sbrollini

[57] ABSTRACT

A view of a three dimensional scene is generated by organizing the view into successive co-centric subsets. For each subset of the view, image data for the subset is generated by rendering the primitives that form the three dimensional scene, whereby the resolution of the image data representing the subsets is varied amongst the subsets. The non-uniform resolution image data representing the subsets of the view is stored in memory. The non-uniform resolution image data is expanded to construct pixel data that represents a non-uniform resolution view of the three dimensional scene. The rendering operation is parallelized by performing a rasterization operation concurrent with a scaling and clipping operation. The rasterization operation rasterizes data defining a given primitive to generate image data that represents contribution of the given primitive to a particular subset of the view. The scaling operation scales data defining the given primitive. The clipping operation clips the scaled data against a clipping volume that corresponds to a subset of the view that is different from the subset of the view utilized by the concurrent rasterization operation. The clipped data is then used in a subsequent rendering operation.

20 Claims, 7 Drawing Sheets

METHOD AND APPARATUS FOR GENERATING NON-UNIFORM RESOLUTION IMAGE DATA

CROSS-REFERENCE TO RELATED APPLICATIONS

The present application claims priority to co-pending U.S. provisional application 60/008,414 filed Dec. 8, 1995.

BACKGROUND OF THE INVENTION

Technical Field

The invention relates generally to image processing systems, and, more particularly, to computer graphics systems for rendering graphics data.

Description of the Related Art

The process of rendering three-dimensional views onto computer screens plays an important role in many application areas, such as computer aided design and review, virtual reality, and video games. For most applications, rendering must be very fast, so as to provide immediate graphic feedback to the user and support an effective man-machine interaction. The cost of rendering a view is proportional to the complexity of the view (i.e. the number of primitives, such as triangles or lines, used to define the view) and to the size and resolution (i.e. number of pixels) of the window where the rendering result is to be displayed. Simplification techniques such as that described in U.S. Pat. No. 5,448,686 to P. Borrel et al. may be employed to replace the original view with one that appears similar, but is composed of simpler, approximating objects. The cost factor that is proportional to the screen resolution is not affected by level of detail management.

An alternative used by many popular programs, such as video games, is to run in low resolution, or equivalently, to use a smaller window. The above mentioned low resolution approach imposes a tradeoff between the details that may be seen on the screen and the viewing angle (field of view), which lowers the effectiveness of the interactive graphical feedback.

Thus, there is a need in the art to provide for cost effective technique for rendering images that provides an improved level of interactive graphical feedback.

SUMMARY OF THE INVENTION

The above-stated problems and related problems of the prior art are solved with the principles of the present invention, method and apparatus for generating non-uniform resolution image data. The present invention may be embodied in a computer graphics system wherein objects are represented by primitives and pixel data that represents a view of the primitives is generated for display on a display device. In this case, the view is organized into portions wherein one of the portions includes another of the portions. A memory is partitioned into subsets corresponding to the portions. For each portion of the view, the primitives are rendered to generate image data that corresponds to the particular portion and the resulting image data is stored in the corresponding subset of the memory. The resolution of the image data representing the one of the portions is different from resolution of the image data representing the another of the portions. In addition, the image data that is stored in at least one subset of the memory is expanded to generate expanded image data. The expanded image data derived from one subset of the memory may be superimposed onto the expanded image data derived from another subset of the memory to generate superimposed expanded image data. The pixel data representing the view is generated according to the expanded image data or superimposed expanded image data.

Preferably, the portions of the view correspond to successive co-centric subsets of the view, and the image data representing the portions correspond to successive zooms of the view. Moreover, resolution of the image data representing portions at the center of the view is preferably higher than resolution of the image data representing portions at the periphery of the view.

More generally, the present invention may be embodied in any image processing system wherein pixel data representing an image is generated for display on a display device. In this case, the image is organized into portions wherein one of the portions includes another of the portions. A memory is partitioned into subsets corresponding to the portions of the image. For each portion of the image, image data representing the given portion of the image is generated and stored in the corresponding subset of the memory. The resolution of the image data representing the one of the portions is different from resolution of the image data representing another of the portions. In addition, the image data that is stored in at least one subset of the memory is expanded to generate expanded image data. The pixel data representing the image is generated according to the expanded image data.

Preferably, the portions of the image correspond to successive co-centric subsets of the image, and the image data representing the portions correspond to successive zoom views of the image. In addition, the resolution of the image data representing portions at the center of the image is preferably higher than resolution of the image data representing portions at the periphery of the image.

DETAILED DESCRIPTION OF THE PRESENT INVENTION

The human retina has a non-uniform resolutions. Finer details may be perceived in the direction of sight than on the periphery of sight. In fact, the resolution decreases rapidly as one moves away from the direction of sight. Moreover, during rapid navigation of a three-dimensional view, the user most often watches the center of the display window. Therefore, there may be little benefit in rendering images with a high peripheral resolution.

The present invention exploits this fact by rendering the center of the display window (where the user will focus) at a higher resolution, while rendering the area moving away from the center of the display window at a decreasing resolution. Thus, the high central resolution is used for displaying the details of the view, while the low peripheral resolution region is used to provide the context of the view. Because the entire view is not rendered at high resolution, the technique is more efficient that conventional rendering techniques.

Figure 1:
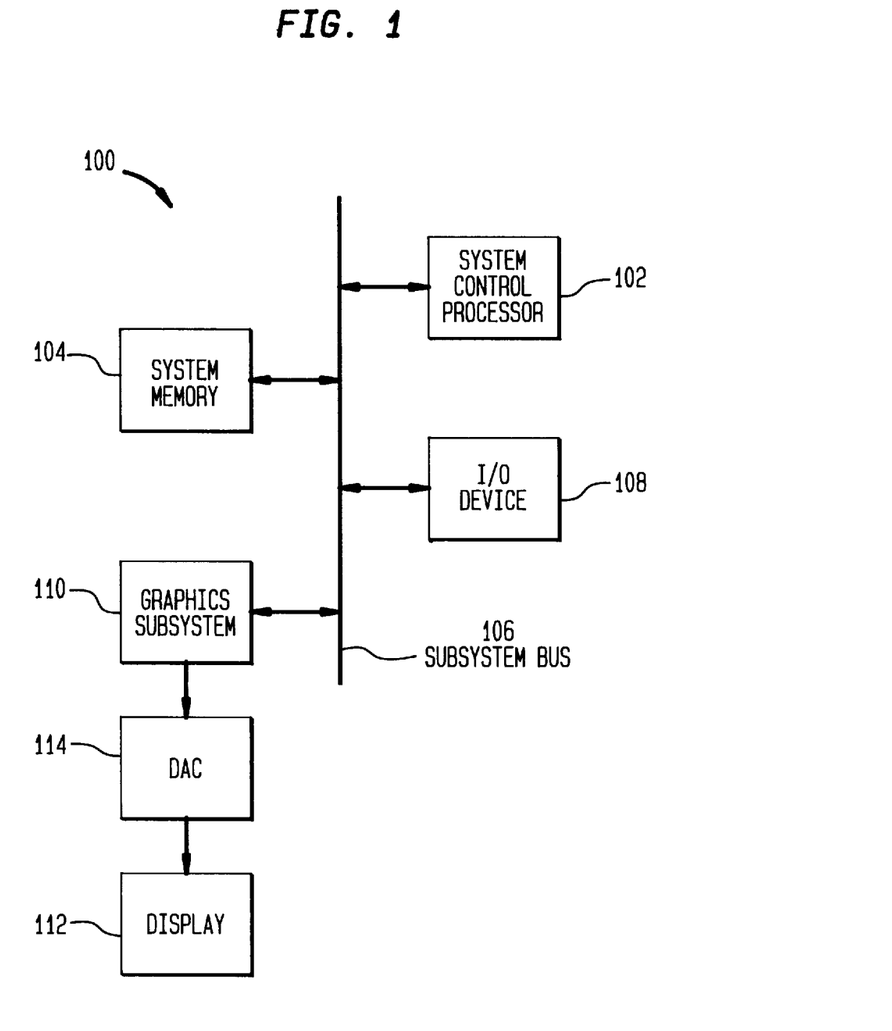
FIG. 1 is a functional block diagram of a computer graphics system.

The overall architecture of the present invention is depicted in FIG. 1. As shown, a graphics system 100 includes a system control processor 102 which is coupled to a system memory 104 via a system bus 106. The system memory 104 consists of random access memory that stores graphics data defining the objects contained in one or more three dimensional models/views. The system memory 104 also stores an application program running on the system memory 104 that provides a user-interface to navigate through and/or modify the three-dimensional models/views defined by the graphics data stored in the memory 104. The graphics data that defines each object consists of coordinates and attributes (e.g. color) of primitives. The primitives are geometric entities such as a solid, line or surface. Typically, the primitives are triangles defined by three vertices. In this case, the system memory 104 includes an ordered list of vertices of triangles that define the surfaces of objects that make up a three dimensional view. In addition, the system memory 104 may store a list of primitive identifiers that correspond to each of the primitives and transformation matrices that specify how and where the primitives are to be displayed. Input/output (I/O) devices 108 interface to the system control processor 102 via the system bus 106. The I/O devices 108 may include a keyboard, template or touch pad for text entry, a pointing device such as a mouse, trackball, Spaceball or light pen for user input, and speech recognition for speech input.

The graphics system 100 also includes a graphics subsystem 110 that interfaces to the system memory 104 via the system bus 106. Generally, the graphics subsystem 110 operates under command from the application program to render the graphics data stored in the system memory 104 for display as an array of pixels in a display area of a display device 112. The display device 112 may utilize raster scan techniques or liquid crystal display techniques to display the pixels. The pixel data generated by the graphics subsystem 110 is in digital form. Typically, the display device 112 requires the pixel data in analog form. In this case, a digital-to-analog converter 114 may be placed between the graphics subsystem 110 and the display device 112 to convert the pixel data from a digital to an analog form.

The graphics subsystem 110 of the present invention as described below may be implemented in hardware as, for example, a gate array or a chip set that includes at least one programmable sequencer, memory, integer processing unit (s) and floating point unit(s), if needed. In addition, the graphics subsystem 110 may include a parallel and/or pipelined architecture as shown in U.S. Pat. No. 4,876,644, commonly assigned to the assignee of the present invention and herein incorporated by reference in its entirety. In the alternative, the graphics subsystem 110 may be implemented in software together with a processor. The processor may be a conventional general purpose processor, a part of the host processor 102, or part of a co-processor integrated with the host processor 102.

Figure 2:
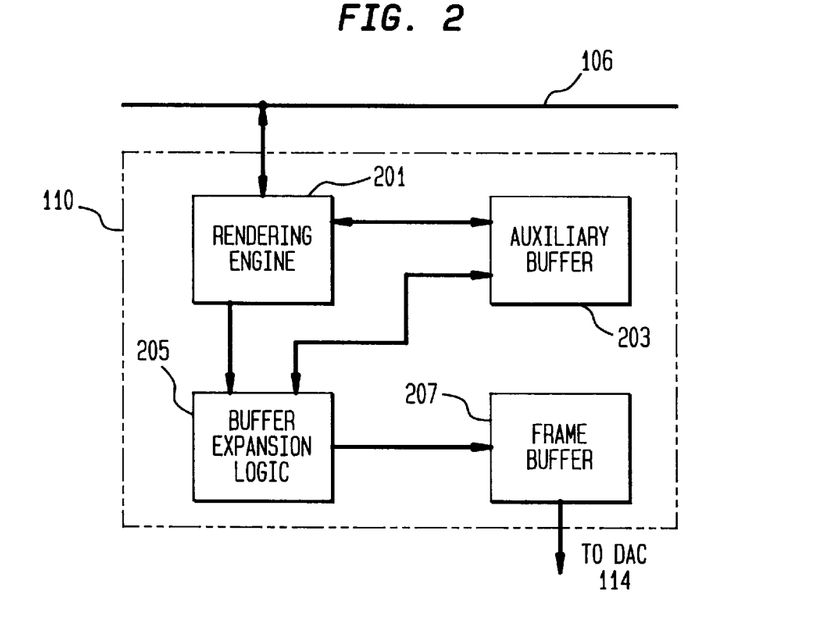
FIG. 2 is a functional block diagram of the graphics subsystem of the present invention.

More specifically, the graphics subsystem 110 includes a control unit 200 that supervises the operation of the graphics subsystem 110. Upon receiving a graphics order to render a scene, the control unit 200 passes the graphics data associated with the graphics order on to a rendering engine. The rendering engine transforms the graphics data associated with the graphics order from the model coordinate system to a view coordinate system and clips the graphics data against a predetermined view volume. In addition, depending upon the shading algorithm to be applied, an illumination model is evaluated at various locations (i.e., the vertices of the primitives and/or the pixels covered by a given primitive). The transformed and clipped graphics data is then passed on to a rasterization stage that converts the transformed primitives into pixels, and generally stores each primitives contribution at each pixel. The rendering engine may be organized in a variety of architectures. A more detailed discussion of such architectures may be found in Foley et. al., "Computer Graphics: Principles and Practice", pp. 855–920 (2nd Ed. 1990), herein incorporated by reference in its entirety.

According to the present invention, the rendering engine 201, under command from the application program running on the system control processor 102, organizes a three-dimensional view into successive portions wherein each portion contains the previous one, renders the graphics data to generate image data that corresponds to each particular portion, and writes the image data to a corresponding subset of the auxiliary buffer 203. The auxiliary buffer is pixel memory that is logically or physically partitioned into subsets (preferably of equal size). Preferably, the rendering engine 201 generates the image data corresponding to the respective portions and/or writes the image data to the auxiliary buffer 205 in parallel with one another. The rendering engine 201 also includes buffer expansion logic 205 that reads the image data representing the portions of the view from the auxiliary buffer 203 to construct pixel data that represents the entire view, and writes the pixel data to a frame buffer 207.

As is conventional, the frame buffer 207 stores pixel data that represents the color for each pixel of the display 112. The pixel data is periodically output from the frame buffer 207 for display on the display device 112. Preferably, the frame buffer 207 is arranged as a matrix of rows and columns each n bits deep. The particular row and column address typically corresponds to a pixel location in the display area of the display device 112. For example, the (row,column) address of (0,1) may correspond to the pixel at location (0,1) of the display device 112. Each row typically represents the pixels of a particular scan line of the display device 112, and each column typically represents the pixels aligned along vertical lines of the display device 112. The n bits at each pixel address encode information pertaining to the pixel. For example, the n bits stored at each pixel address in the Z-buffer 214 represent the depth of the object visible at that pixel.

In addition, the graphics subsystem 110 may include two frame buffers. As in conventional, one of the frame buffers serves as the active display portion, while the other frame buffer is updated for subsequent display. Either frame buffer may change from being active to inactive in accordance with the needs of the system 100; the particular manner in which the changeover is accomplished is not relevant to the present invention.

Moreover, if the organization of the frame buffer does not correspond to the display area of the display device 112, a scaling operation can be performed on the pixel values stored in the frame buffer, thereby shrinking or enlarging the image stored in the frame buffer for display. Scaling up may be obtained by duplicating pixel color values or by performing linear or bilinear interpolations between the color values to fill gaps between the original pixel values stored in the frame buffer that are to be scaled up for display in the display area of the display device 112. Scaling down may be obtained by averaging color values of adjacent pixels. An example of such scaling algorithms may be found in Foley et al., "Computer Graphics: Principles and Practice", pp. 815–826 (2nd Ed. 1990), herein incorporated by reference in its entirety.

Moreover, the number of portions that make up the entire view and the size of one or more of such portions may be varied by user input. In the alternative, the number and size of the portions of the view may be varied by the application program to meet a desired performance/quality trade off.

Figure 3:
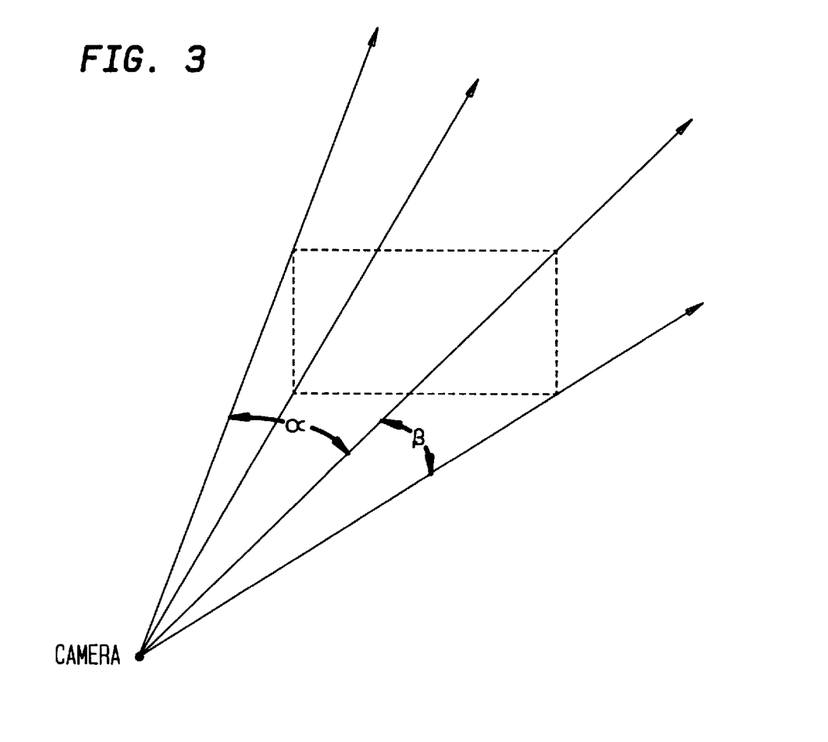
FIG. 3 is a pictorial representation of a viewing frustrum in a computer graphics system.

Preferably, the rendering engine 201 of the present invention organizes the view into portions corresponding to co-centric fields of view. As shown in FIG. 3, the viewing frustrum is the area of model space that can be seen by the camera (eye) from the specified viewpoint. For graphics purposes, the viewing frustrum is bounded by 4 planes that intersect the viewpoint. Two of these planes are vertical in the camera coordinate system and are oriented by an angle α with respect to one another. The other two are horizontal in the camera coordinate system and are oriented by an angle β with respect to one another. The view is preferably defined by position (viewpoint) and orientation (viewing direction) of the camera and two parameters, $FOV_\alpha$ and $FOV_\beta$. $FOV_\alpha$ represents the magnitude of the angle α, and $FOV_\beta$ represents the magnitude of the angle β that defines the vertical component H of the viewing window. A field of view that is co-centric to another field of view is defined by scaling the magnitude of one or both of the parameters $FOV_\alpha$ and $FOV_\beta$. For example, consider the case wherein the view is defined by parameters $FOV_\alpha$ and $FOV_\beta$ that are of equal magnitude. In this example, a given view may be represented by the parameter $B_0$. In this case, a field of view that is co-centric to the given field of view is defined by scaling the parameter $B_0$, and thus represented by the parameter $B = K * B_0$, wherein K is a scaling factor. For example, the rendering engine 201 may divide the view (represented by a parameter $B_0$) into four portions corresponding to four co-centric fields of view: a first portion that is the entire view ($K_1=1$, thus $B_1=B_0$), a second portion that is the subset of the view that lies inside a smaller central field of view ($K_2=0.75$, thus $B_2=0.75\ B_0$), a third portion that is the subset of the view that lines inside an even smaller central field of view ($K_3=0.5$, thus $B_3=0.5\ B_0$), and a fourth portion that is the subset of the view that lines inside an even smaller central field of view ($K_4=0.25$, thus $B_4=0.25\ B_0$). This process may be repeated for smaller and smaller co-centric fields of view as many times as necessary. Moreover, the values of K as indicated are for example only and may be varied according to the design of the system.

Moreover, the degree of resolution of the image data generated by the rendering engine 201 and stored in the subsets of the auxiliary buffer 203 preferably varies across the subsets of the auxiliary buffer 203. When the portions of the view correspond to co-centric fields of view as described above, this may be accomplished by rendering each portion of the view to a fixed number of pixels which is predetermined fraction 1/A, for example ¼, of the height and width of the pixel data that will be generated by the buffer expansion logic 205. In other words, each subset of the view is rendered to the same predetermined auxiliary buffer size. In this case, the auxiliary buffer 503 may be logically or physically divided into sections wherein each section corresponds to a portion/subset of the view and has a predetermined size and aspect ratio such that the section stores the fixed number of pixels generated by the rendering engine 201. For example, in the case where the rendering engine 201 divides the view into four portions corresponding to four co-centric fields of view, the auxiliary buffer is preferably logically or physically divided into four sections: a first section storing the image data corresponding to the first portion that represents a low resolution image of the view as seen under the desired viewing conditions, a second section storing the image data corresponding to the second portion that represents an enlarged (i.e., similar to zooming) image of the second portion at a higher resolution than the image data corresponding to the first portion, a third section storing the image data corresponding to the third portion that represents an enlarged image of the third portion at a higher resolution than the image data corresponding to the first and second portions, and a fourth section storing the image data corresponding to the fourth portion that represents an enlarged image of the fourth portion at a higher resolution than the image data corresponding to the first, second and third portions.

Figure 4:
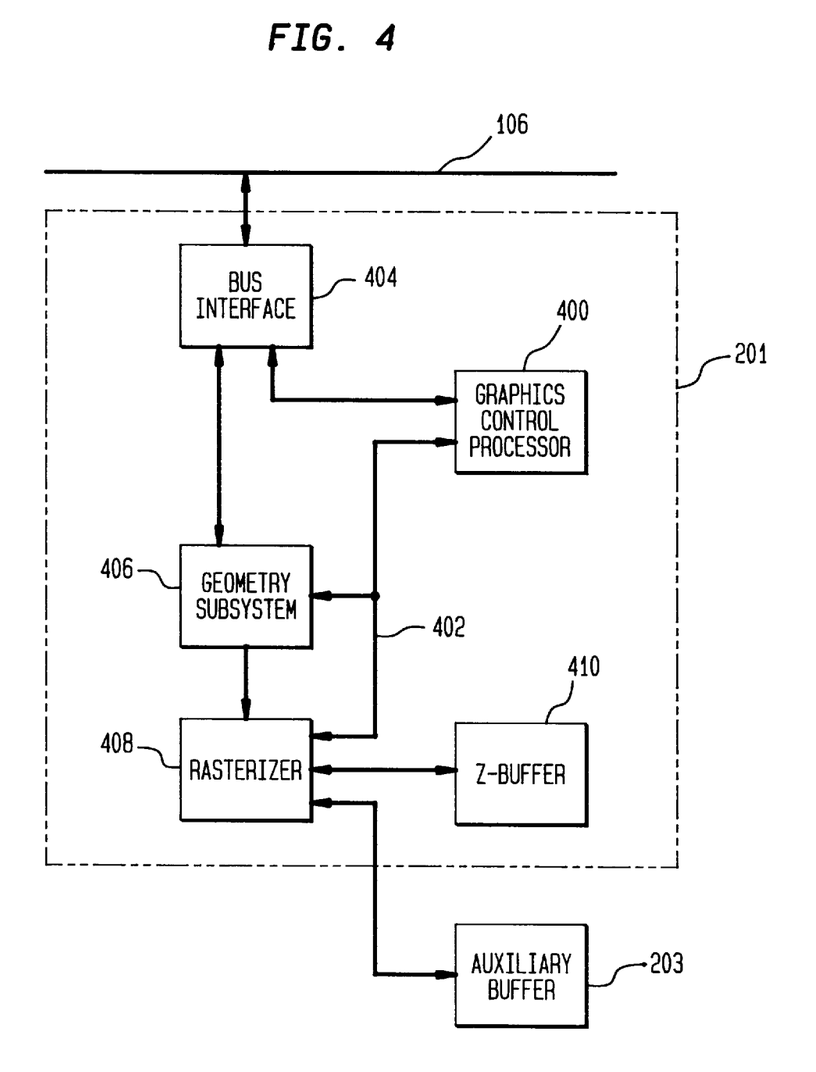
FIG. 4 is a functional block diagram of an embodiment of rendering engine of FIG. 2 according to the present invention.

The functionality of the present invention may be integrated into rendering engines having a variety of architectures. For the sake of description, an example of a common rendering engine is set forth below. More specifically, as shown in FIG. 4, a common rendering engine includes a graphics control processor 400 that supervises the operation of the rendering engine 201. The graphics control processor 400 controls the operations performed by the other elements of the rendering engine 201 via a control bus 402. The rendering engine 201 attaches to the system bus 106 via the bus interface 404, which reads and writes data from and to the system bus 106 by performing the communication protocol of the system bus 106.

The rendering engine 201 includes a geometry subsystem 406 and a rasterizer 408 coupled to the bus interface 404. The rasterizer 408 is coupled to a Z-buffer 410 and the auxiliary buffer 203. As described above, for each portion/subset of the view, the auxiliary buffer 203 stores a fixed number of pixels which is predetermined fraction 1/A of the height and width of the pixel data that will be generated by the buffer expansion logic 205. The Z-buffer 410 contains sufficient memory to store a depth value, for example a 24-bit integer, for each pixel of the auxiliary buffer 203 that corresponds to at least one portion/subset of the view. Preferably, the Z-buffer 410 contains sufficient memory to store a depth value for each pixel of the auxiliary buffer 203 (i.e., for the pixels of the auxiliary buffer corresponding to each portion/subset of the view). A more detailed description of the operation of the Z-buffer 410 and auxiliary buffer 203 is discussed below.

The geometry subsystem 406 performs transformation and clipping operations on the graphics data. More specifically, the geometry subsystem 406, if need be, transforms the graphics data from the intrinsic coordinate system of the model as stored in the system memory 104 into a world coordinate system. This may be done by transforming the vertices of each primitive with a single transformation matrix that is the concatenation of a plurality of modeling transformation matrices. In addition, one or more surface normal vectors associated with each primitive or vertex (depending upon the shading method to be applied) may need to be transformed.

The geometry subsystem 406 also performs a viewing transformation on each primitive that transforms the coordinates of the primitive from the world coordinate system to the view coordinate system. As described above with respect to FIG. 4, the origin of the view coordinate system preferably lies in the center of the viewing window. In the case where the graphics data consists of vertices of triangles, the viewing transformation operation results in a list of the vertices of the triangles in the view coordinate system. In addition, the geometry subsystem 406 also preferably performs a perspective projection on the view coordinates of each primitive to provide for perspective foreshortening. A more detailed description of the transformation operations of the geometry subsystem 406 may be found in Foley, Van Dam, Feiner and Hughes, Computer Graphics Principles and Practice, pp. 201–281, 866–869 (2nd Ed. 1990), herein incorporated by reference in its entirety.

Moreover, the geometry subsystem 406 performs a clipping operation wherein the primitives are clipped against a clipping volume to define the portions of the transformed primitives that are potentially visible. The clipping volume is defined by a set of $(X_{MIN}, X_{MAX})$, $(Y_{MIN}, Y_{MAX})$, $(Z_{MIN}, Z_{MAX})$ pairs. The $(X_{MIN}, X_{MAX})$ and $(Y_{MIN}, Y_{MAX})$ pairs are preferably defined by the magnitude of the parameters $FOV_\alpha$ and $FOV_\beta$. In addition, the geometry subsystem 406 maps the coordinates of the vertices of the primitives output from the clipping operation to a normalized device coordinate system as required by the rasterizer 408. The result of this step in the rendering pipeline is a list of vertices in the normalized device coordinate system that describe potentially visible portions of the primitives. A more detailed description of the clipping operation may be found in Foley, Van Dam, Feiner and Hughes, Computer Graphics Principles and Practice, pp. 110–132, 924–945, 869–870 (2nd Ed. 1990), herein incorporated by reference in its entirety.

In addition, the rendering engine 210 may perform lighting calculations that simulate the effects of light sources on the surfaces of the objects of the three-dimensional view/model. Typically, the lighting calculations depend upon (a) the properties of the viewer, (b), the properties of the objects being rendered, and (c) the properties of one or more light sources. Properties of the viewer may include the position of the viewer with respect to the objects being rendered. The properties of the objects may include the location and normal vector of each vertex of the triangles that define the objects. And the properties of the light sources depend upon the type (ambient, directional, spotlight, etc.) and may include intensity, color, direction, attenuation factors, and cone angle). A more detailed description of the steps for carrying out such lighting calculations may be found in Foley, Van Dam, Feiner and Hughes, Computer Graphics Principles and Practice, pp. 721–814 (2nd Ed. 1990), herein incorporated by reference in its entirety.

Typically, lighting calculations are performed once during the rendering process for every vertex of the triangles of the objects of the view. Thus, as shown in FIG. 4, a lighting calculations may be performed by the geometry subsystem 406. However, the lighting calculations may be calculated for every pixel. Typically, this is accomplished in conjunction with shading calculations performed by the rasterizer 408. In this case, the lighting calculations are embedded into the shading calculations performed by the rasterizer 408.

The operation of the rasterizer 408 may be divided into three tasks: scan conversion, shading, and visibility determination. Scan conversion decomposes the potentially visible portion of the primitives into individual pixels. Shading computes the colors of each pixel. And visibility determination utilizes the z coordinate (or depth value) of the primitive at each pixel to compute the set of pixels which are "visible" for the primitive. Thus, for each pixel covered by a potentially visible portion of a primitive, the rasterizer 408 produces pixel information, e.g. color and depth of the primitive, and when appropriate writes the color information and depth of the primitive at the given pixel to the corresponding location in the auxiliary buffer 203 and Z-buffer 410, respectively. A more detailed description of the operation of the rasterizer 408 may be found in Foley, Van Dam, Feiner and Hughes, Computer Graphics Principles and Practice, pp. 649–720, 870–871 (2nd Ed. 1990) and U.S. Pat. No. 4,805,116 to B. C. Liang et al., which is commonly assigned to the assignee of the present invention, both herein incorporated by reference in their entirety.

The rendering of the successive portions of the view may be accomplished by the rendering engine 201 of FIG. 4 as follows. More particularly, for each element (such as a triangle) of the view, the processing of the rendering engine is divided into a plurality of time periods each corresponding to a portion of the view as described above. For simplicity, consider an example wherein the view is divided into four portions as described above. In this case, the processing is divided into four time periods, t0 through t3.

During t0, the following occurs:

1] The graphics control processor 400 controls the clipping operation performed by the geometry subsystem 406 such that the $(X_{MIN}, X_{MAX})$, $(Y_{MIN}, Y_{MAX})$ pairs that defines the clipping volume corresponding to the entire field of view, which is preferably accomplished by communicating the two unscaled parameters $FOV_\alpha$ and $FOV_\beta$ to the geometry subsystem 406.

2] The subset of the auxiliary buffer 203 corresponding to the first portion of the field of view (i.e., the entire view) is activated.

3] The graphics data pertaining to the particular element is rendered by the geometry subsystem 402 and rasterizer 408, and the resultant image data is stored in the activated subset of the auxiliary buffer 203.

During t1, the following occurs:

4] The graphics control processor 400 controls the clipping operation performed by the geometry subsystem 406 such that the $(X_{MIN}, X_{MAX})$, $(Y_{MIN}, Y_{MAX})$ pairs that defines the clipping volume corresponds to the second portion of the field of view, which is preferably accomplished by communicating to the geometry subsystem 406 the parameters $FOV_\alpha$ and $FOV_\beta$ scaled by a scaling factor that corresponds to the second portion of the field of view, for example $K_2=0.75$.

5] The subset of the auxiliary buffer 203 corresponding to the second portion of the field of view is activated.

6] The graphics data pertaining to the particular element is rendered by the geometry subsystem 402 and rasterizer 408, and the resultant image data is stored in the activated subset of the auxiliary buffer 203.

During t2, the following occurs:

7] The graphics control processor 400 controls the clipping operation performed by the geometry subsystem 406 such that the $(X_{MIN}, X_{MAX})$, $(Y_{MIN}, Y_{MAX})$ pairs that defines the clipping volume corresponds to the third portion of the field of view, which is preferably accomplished by communicating to the geometry subsystem 406 the parameters $FOV_\alpha$ and $FOV_\beta$ scaled by a scaling factor that corresponds to the third portion of the field of view, for example $K_4=0.5$.

8] The subset of the auxiliary buffer 203 corresponding to the third portion of the field of view is activated.

9] The graphics data pertaining to the particular element is rendered by the geometry subsystem 402 and rasterizer 408, and the resultant image data is stored in the activated subset of the auxiliary buffer 203.

During t3, the following occurs:

10] The graphics control processor 400 controls the clipping operation performed by the geometry subsystem 406 such that the $(X_{MIN}, X_{MAX}), (Y_{MIN}, Y_{MAX})$ pairs that defines the clipping volume corresponds to the fourth portion of the field of view, which is preferably accomplished by communicating to the geometry subsystem 406 the parameters $FOV_\alpha$ and $FOV_\beta$ scaled by a scaling factor that corresponds to the fourth portion of the field of view, for example $K_4=0.25$.

11] The subset of the auxiliary buffer 203 corresponding to the fourth portion of the field of view is activated.

12] The graphics data pertaining to the particular element is rendered by the geometry subsystem 402 and rasterizer 408, and the resultant image data is stored in the activated subset of the auxiliary buffer 203.

After the above processing has been complete for each element of the view, the subsets of the auxiliary buffer stores the following: the first subset stores image data corresponding to the first portion of the view that represents a low resolution image of the view as seen under the desired viewing conditions, the second subset stores image data corresponding to the second portion of the view that represents an enlarged image of the second portion of the view at a higher resolution than the image data corresponding to the first portion, the third subset stores image data corresponding to the third portion of the view that represents an enlarged image of the third portion of the view at a higher resolution than the image data corresponding to the first and second portions, and the fourth subset stores image data corresponding to the fourth portion of the view that represents an enlarged image of the fourth portion of the view at a higher resolution than the image data corresponding to the first, second and third portions.

With reference to FIG. 2, the buffer expansion logic 205 generates pixel data that represents the entire view according to the image data stored in the auxiliary buffer 203. The buffer expansion unit 205 may generate the pixel data by sequentially processing the lowest resolution image data to the highest resolution image data. In the example above, the lowest resolution image data is the image data corresponding to the first portion (i.e., the entire view), and the highest resolution image data is the image data corresponding to the fourth portion of the view.

More particularly, in processing the lowest resolution image data, the buffer expansion logic 205 reads the lowest resolution image data (e.g., the image data corresponding to first portion) from the auxiliary buffer 203. The buffer expansion logic 205 then scales the image data by a ratio of $A*K_1$, wherein $1/A$ as described above is a predetermined fraction and $K_1$ is the scaling factor associated with the first portion. The buffer expansion logic 205 then writes the scaled image data to a portion of the frame buffer 207 corresponding to the first portion of the view. In the example described above, the scaling factor $K_1$ for the first portion is 1; therefore, in this case, the entire frame buffer 207 preferably corresponds to the first portion of the view. The scaling operation may be performed utilizing pixel replication techniques (which is very fast but produces crude images and noticeable artifacts) or by pixel interpolation (which is slower, but produces visually pleasing, smoother results). A more detailed description of both pixel replication and pixel interpolation may be found in Foley et. al., "Computer Graphics: Principles and Practice", pp. 815–826 (2nd Ed. 1990), incorporated by reference above in its entirety. At this point, the pixel data stored in the frame buffer 207 is the desired image, but at very low resolution.

The buffer expansion logic 205 then processes the image data having the next higher resolution (e.g., the image data corresponding to the second portion). More particularly, the buffer expansion logic 205 reads the image data having the next-higher resolution from the auxiliary buffer 203. The buffer expansion logic 205 then scales the image data by a ratio of $A*K_2$, wherein $1/A$ is a predetermined fraction and $K_2$ is the scaling factor associated with the second portion of the view. The buffer expansion logic 205 then writes the scaled image data to a portion of the frame buffer 207 corresponding to the second portion of the view, which preferably is a central portion of the frame buffer 207.

The buffer expansion logic 205 then processes the image data having the next-higher resolution (e.g., the image data corresponding to the third portion). More particularly, the buffer expansion logic 205 reads the image data having the next-higher resolution from the auxiliary buffer 203. The buffer expansion logic 205 then scales the image data by a ratio of $A*K_3$, wherein $1/A$ is a predetermined fraction and $K_3$ is the scaling factor associated with the third portion of the view. The buffer expansion logic 205 then writes the scaled image data to a portion of the frame buffer 207 corresponding to the third portion of the view, which preferably is a central portion of the frame buffer 207.

The processing continues as described above for image data having the next-higher resolution until the highest resolution image data (e.g., the image data corresponding to the fourth portion) is encountered. In this case, the buffer expansion logic 205 reads the image data having the highest resolution from the auxiliary buffer 203. Preferably, the buffer expansion logic 205 need not scale the image data because the ratio of $A*K_4$ is unity. As described above, $1/A$ is a predetermined fraction and $K_4$ is the scaling factor associated with the fourth portion of the view. However, if need be, the buffer expansion logic 205 may scale the image data by a ratio of $A*K_4$. The buffer expansion logic 205 then writes the scaled image data to a portion of the frame buffer 207 corresponding to the fourth portion of the view, which preferably is a central portion of the frame buffer 207.

After the operation of the buffer expansion logic 205 is complete, the resultant pixel data stored in the frame buffer 207 is a complete image with full resolution at the center and decreasing resolution as one moves towards the periphery. The pixel data is then output to the digital-to-analogue converter 114 for display as is conventional.

In an alternate embodiment, the buffer expansion unit 205 and digital-to-analog converter 114 as described above may be substituted by a logic-enhanced digital-to-analog converter that constructs a non-uniform resolution image of the entire view in one pass by accessing all of the image data stored in the auxiliary buffer 203. Generally, the logic-enhanced digital-to-analog converter scans across the pixels of the viewing window one scan line at a time, and for each pixel reads the corresponding color data from one subset of the auxiliary buffer 203 and converts it from its digital form to an analog signal for output to the display device.

Figure 5A:
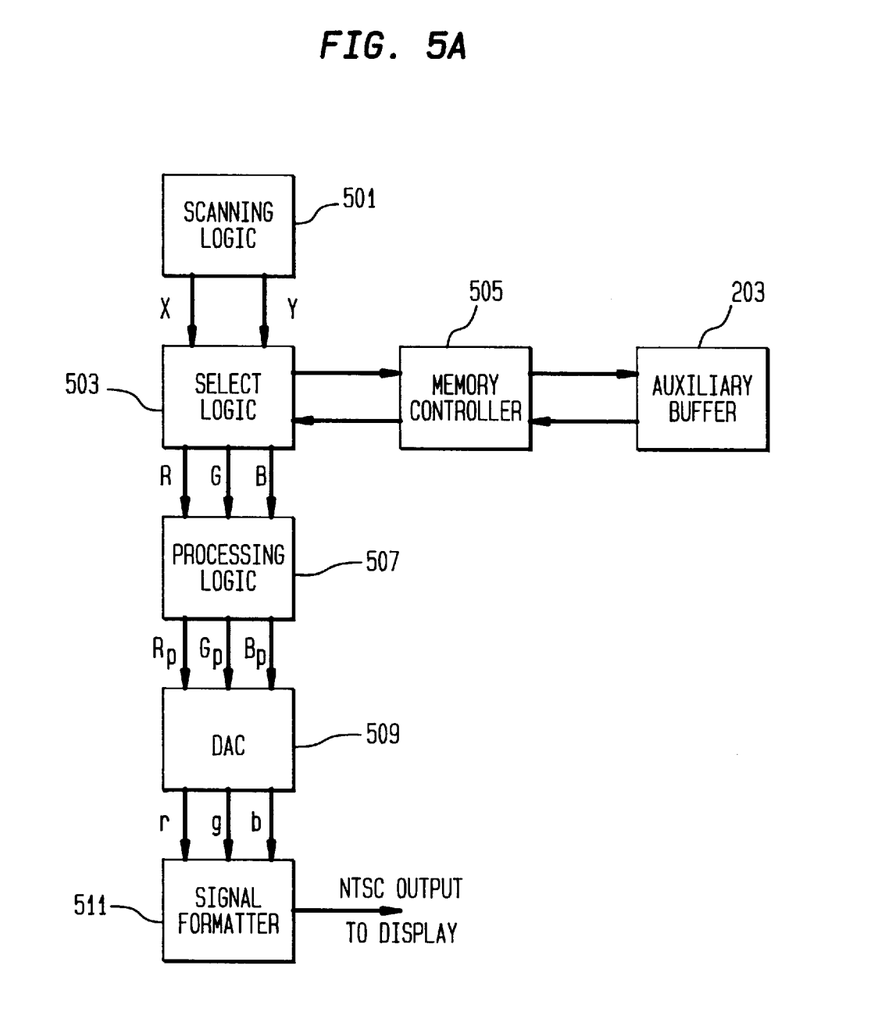
FIG. 5(A) is a pictorial representation of an image organized into portions according to the present invention.

More specifically, as shown in FIG. 5(A), the logic-enhanced digital-to-analog converter includes scanning logic 501 that scans across the pixels of the scan lines of the viewing window in x and y. As in conventional, the scanning logic 501 generates a signal y that represents the current scan line and a signal x that represents the current pixel in the current scan line. In addition, the logic-enhanced digital-to-analog converter includes select logic 503 and a memory controller 505 that accesses the appropriate subset of the auxiliary buffer 203 that corresponds to the given pixel, and reads out the color data (R,G,B) corresponding to the pixel. The color data (R,G,B) may be supplied to processing logic 507 which scales, blends, or performs other processing functions on the color data. Examples of such processing functions is described in "Computer Graphics: Principles and Practice", pp. 815–826 (2nd Ed. 1990), incorporated by reference above in its entirety. The resultant color data is then output to a Digital-to-Analog Converter (DAC) 509 that converts the digital color data (R.G,B) to analog form (r,g,b). The analog color data (r,g,b) is then output to a signal formatter that formats the color data in a format suitable for the display device, for example an NTSC signal. The resultant signal is then output to the display 112.

Figure 5B:
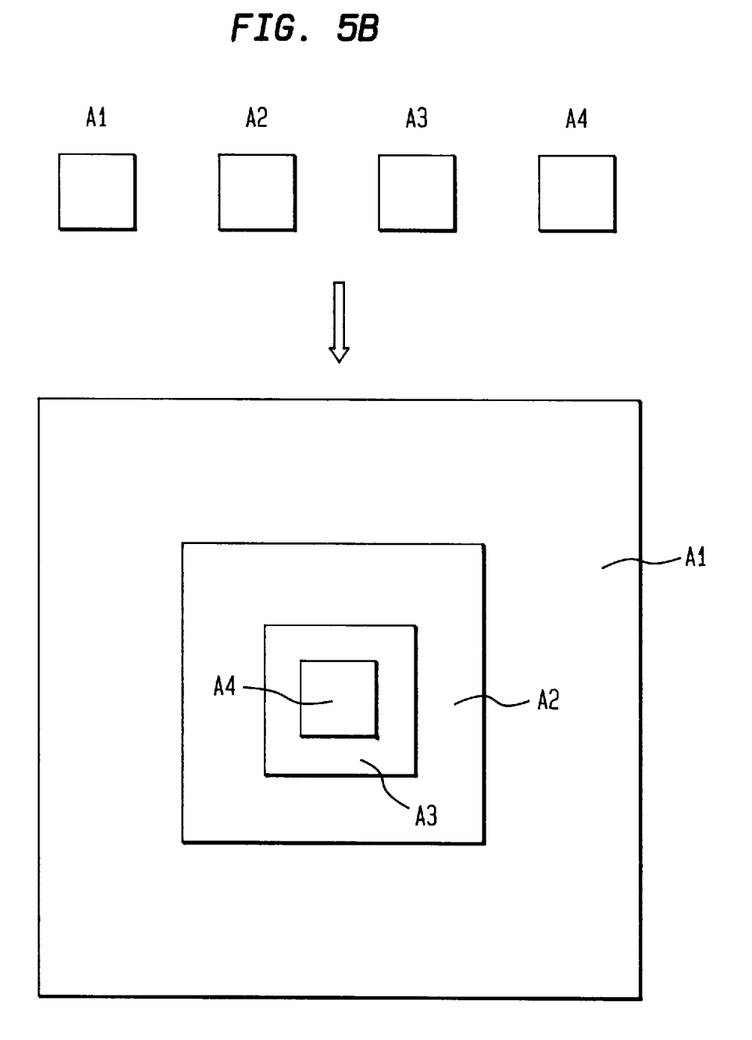
FIG. 5(B) is a function block diagram of an embodiment of logic-enhanced digital-to-analog converter according to the present invention.

The select logic 503 may be implemented in many different ways depending upon the design of the system. For simplicity, consider an example as shown in FIG. 5(B) wherein the auxiliary buffer is partitioned into four (4) subsets A1,A2,A3,A4 each storing color data pertaining to 2p×2p pixels, and the scaling factors K1,K2,K3,K4 associated with the subsets A1,A2,A3 and A4 are 1, 0.5, 0.25, 0.125, respectively. Thus, the viewing window is derived from subset A1 scaled eight times (8×), subset A2 scaled four times (4×), subset A3 scaled two times (2×), and subset A1 unscaled (1×) as shown. The current pixel is identified by the signals x, y output from the scanning logic 501. The select logic 503 preferably accesses the appropriate subset (A1,A2,A3, or A4) of the auxiliary buffer 203 and the location (denoted $x_0,y_0$) within that subset from which the color of the current pixel should be copied. The following pseudocode suggests a simple implementation of the selection process performed by the select logic 503:

if (7p<=x<=9p) and (7p<=y<=9p)
  then use A4 with $x_0$=x−7p, and $y_0$=y−7p
  else
    if (6p<=x<=10p) and (6p<=y<=10p)
    then use A3 with $x_0$=(x−7p)/(2+1) and
      $y_0$=(y−7p)/(2+1)
    else
      if (4p<=x<=12p) and (4p<=y<=12p)
      then use A2 with $x_0$=(x−4p)/(4+1), and
        $y_0$=(y−4p)/(4+1)
      else
        use A1 with $x_0$=x/(8+1) and
        $Y_0$=Y/(8+1)

Note that the notation "<=" indicates a less than or equal operation and "/" indicates a divide operation where in the result is truncated to the near lower or equal integer.

Figure 6:
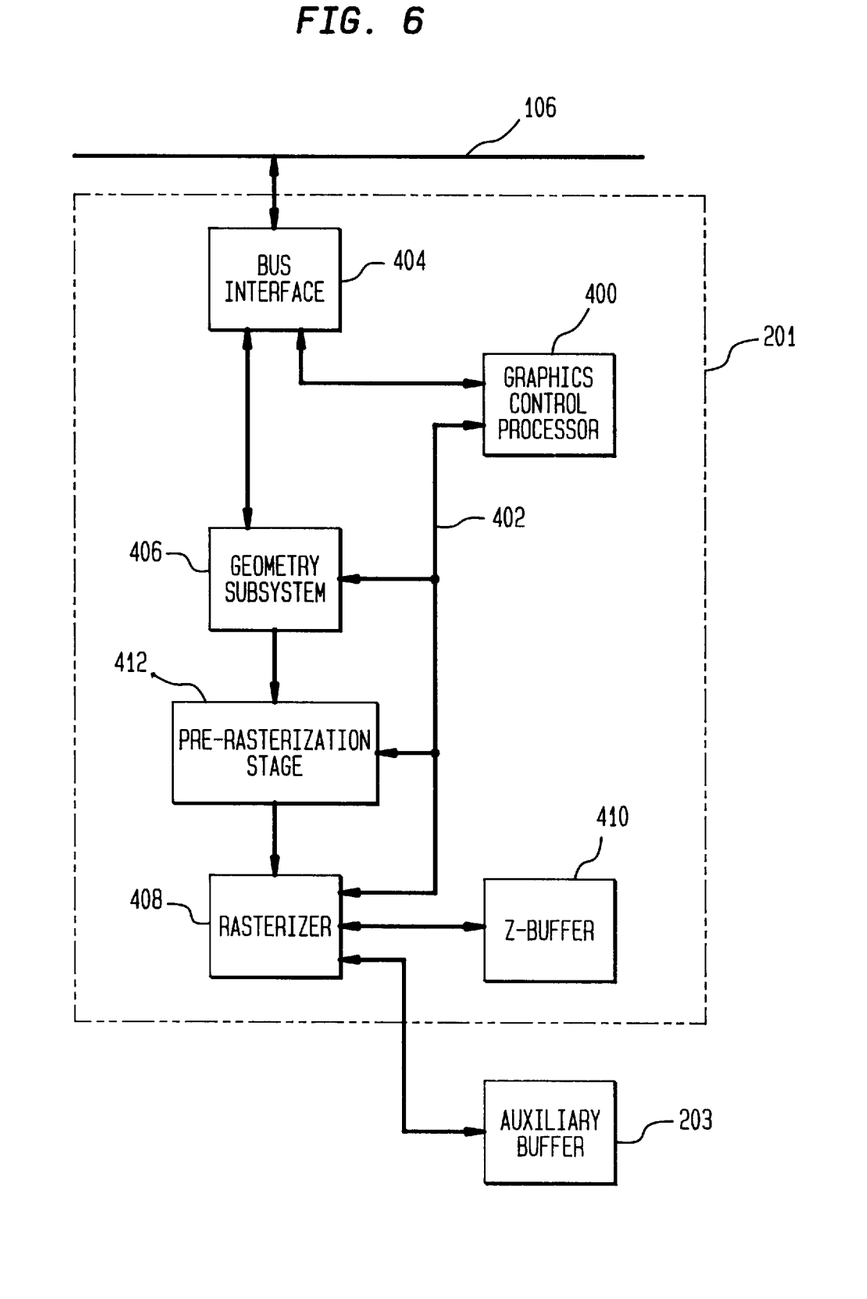
FIG. 6 is a functional block diagram of an embodiment of rendering engine of FIG. 2 according to the present invention.
Figure 7:
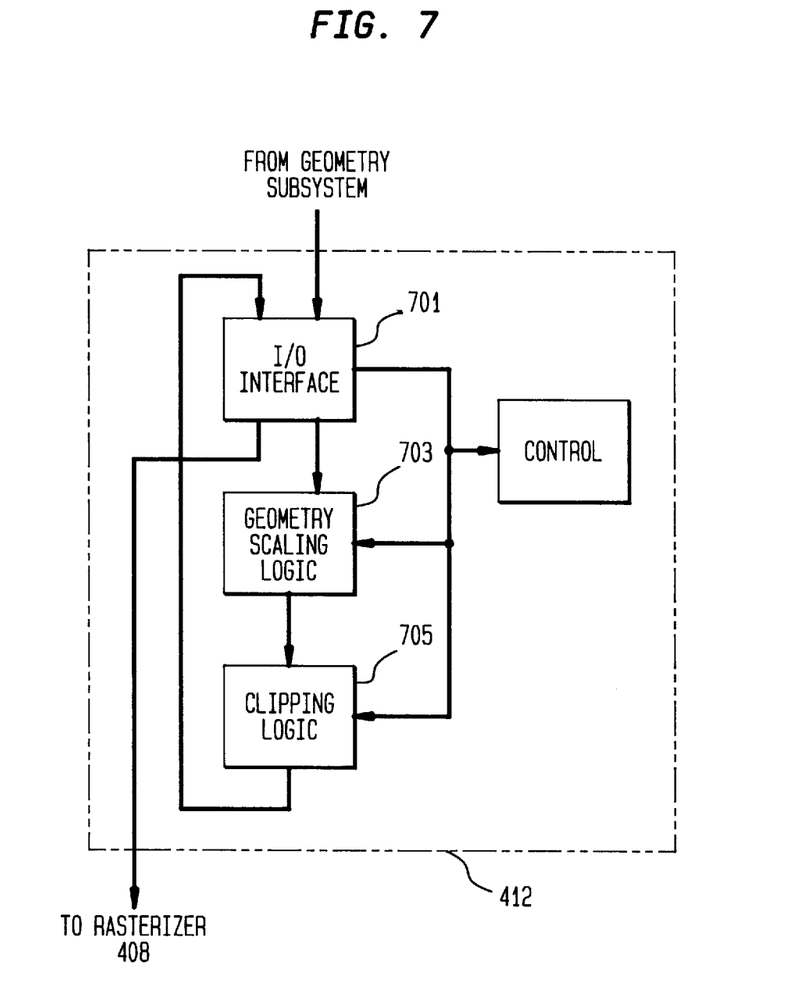
FIG. 7 is a functional block diagram of the Pre-Rasterization Stage of FIG. 6 according to the present invention.

The rendering engine 201 as described above with respect to FIG. 4 may involve redundant geometric computations (performed by the geometry subsystem 406) when rendering the portions of the entire view one after another. According to an alternate embodiment of the present invention, an alternate rendering engine is provided that avoids such redundant calculations. As shown in FIG. 6, the alternate rendering engine is similar to the rendering engine discussed above with respect to FIG. 4, including a graphics control processor 400 that supervises the operation of the rendering engine and a geometry subsystem 406 and rasterizer 408 that is coupled to a Z-buffer 412 and the auxiliary buffer 203. However, the alternate rendering engine includes a pre-rasterization stage 412 coupled between the geometry subsystem 406 and the rasterizer 408. As shown in FIG. 7, the pre-rasterization stage 412 includes an I/O interface 701, geometry scaling logic 703, and clipping logic 705. Control logic 707 supervises the operation of I/O interface 701, geometry scaling logic 703, and clipping logic 705. The I/O interface 701, geometry scaling logic 703, and clipping logic 705 processes the resultant data output from the geometry subsystem 406 as follows.

More particularly, for each element (such as a triangle) of the view, the processing of the pre-rasterization stage 412 is divided into a plurality of time periods each corresponding to a portion of the view as described above. For simplicity, consider an example wherein the view is divided into four portions as described above. In this case, the processing is divided into four time periods, t0 through t3.

During t0, the following occurs:

1] I/O interface 701 reads the data from the geometry subsystem 406 and routes the data to the rasterizer 408 and to the geometry scaling logic 703. The data routed to the rasterizer 408 includes the vertices of the particular element.

2] The rasterizer 408 utilizes the Z-buffer 410 and the appropriate subset of the auxiliary buffer 203 to render the contribution of the particular element to first portion of the view, preferably, at low resolution, thus writing the resultant image data to the appropriate subset of the auxiliary buffer 203.

3] The scaling logic 703 scales up by a factor $1/K_2$ the x and y coordinate data of the vertices of the particular element supplied via the I/O interface 701. The resultant scaled vertex data is supplied to the clipping logic 705 that clips the scaled vertex data to the borders of the appropriate subset of the auxiliary buffer 203. The resultant clipped data is output to the I/O interface 701.

During t1, the following occurs:

4] the I/O interface 701 routes the clipped data generated by the clipping logic in period t0 to the rasterizer 408 and to the geometry scaling logic 703.

5] The rasterizer 408 utilizes the Z-buffer 410 and the appropriate subset of the auxiliary buffer 203 to render the contribution of the particular element to the second portion of the view, preferably at higher resolution than the resolution of the first portion, thus writing the resultant image data to the appropriate subset of the auxiliary buffer 203.

6] The geometry scaling logic 703 scales up the x and y coordinate data supplied via the I/O interface 701 by a factor $K_2/K_3$. The resultant scaled data is supplied to the clipping logic 705 that clips the scaled data to the borders of the appropriate subset of the auxiliary buffer 203. The resultant clipped data is output to the I/O interface 701.

During t2, the following occurs:

7] the I/O interface 701 routes the clipped data generated by the clipping logic in period t1 to the rasterizer 408 and to the geometry scaling logic 703.

8] The rasterizer 408 utilizes the Z-buffer 410 and the appropriate subset of the auxiliary buffer 203 to render the contribution of the particular element to the third portion of the view, preferably at a higher resolution than the resolution of the first and second portions, thus writing the resultant image data to the appropriate subset of the auxiliary buffer 203.

9] The geometry scaling logic 703 scales up the x and y coordinates of the vertex data supplied via the I/O interface 701 by a factor $K_3/K_4$. The resultant scaled data is supplied to the clipping logic 705 that clips the scaled data to the borders of the appropriate subset of the auxiliary buffer 203. The resultant clipped data is output to the I/O interface 701, or may be output directly to the rasterizer 408.

During t3, the following occurs:

10] the rasterizer 408 loads the clipped data generated by the clipping logic 705 in period t2.

11] The rasterizer 408 utilizes the Z-buffer 410 and the appropriate subset of the auxiliary buffer 203 to render the contribution of the particular element to fourth portion of the view, preferably at a higher resolution than the resolution of the first, second and third portions, thus writing the resultant image data to the appropriate subset of the auxiliary buffer 203.

After the operations described above with respect to period t0 to t3 are completed, the buffer expansion logic 205 generates pixel data that represents the entire view according to the image data stored in the auxiliary buffer 203 as described above.

In an alternate embodiment, the rendering engine as described above with respect to FIGS. 6 and 7 may have a parallel architecture. In this case, more than one rasterizer and associated pre-rasterization stage is provided such that the operations of more than one of periods t0 through t3 can be executed in parallel.

In addition, the rendering engine may be controlled to selectively operate in one of two modes: standard mode and non-uniform resolution mode. In standard mode, the rendering engine is controlled to operate as is conventional thus generating a uniform resolution image for display. In non-uniform resolution mode, the rendering engine is controlled as described above with respect to the present invention. The switching between the two modes may be based upon, for example, user input or the performance of the system.

Moreover, the non-uniform resolution image generation technique of the present invention may also be applied in the transmission of images, for example MPEG video images. In this case, an image generator organizes the image into successive portions, for example, as shown in FIG. 5(A), and generates image data of variable resolution for each portion. Preferably, the resolution of the image data increases from the central portion to the peripheral portion(s). To transmit the image from the image generator to a receiver over a communication link, the image generator first transmits the lowest resolution image data, which preferably corresponds to the entire image, to the receiver over the communication link. Depending upon the performance constraints on the system, the image generator may (or may not) transmit the higher resolution image data, which preferably corresponds to the central portions, to the receiver over the communication link.

The receiver expands the received image data corresponding to one or more of the portions depending upon the performance constraints of the system. For example, if the a display refresh cycle occurs and the receiver has received only the lowest resolution image data, the receiver may expand the low resolution image data for display. However, if the a display refresh cycle occurs and the receiver has received the lowest resolution image data and the next-lowest resolution image data, the receiver may expand the low resolution image data and the next-lowest resolution image data for display. Preferably, the receiver utilizes the expansion techniques describe above with respect to the buffer expansion logic and/or logic-enhanced buffer expansion logic to expand the image data.

The communication link described above may be, for example, a computer network, a television delivery system, a cable television delivery system, a video phone link or any other means of communicating image data from the image generator to the receiver.

By generating image data having higher resolution at the center of the display window, and generating image data with lower resolution as one moves away from the center of the display window to the periphery, the image generation scheme of the present invention is more efficient than conventional techniques, while providing an effective level of detail for the display. This technique is suitable for use in traditional graphics systems, head mounted displays, desk-top monitors, large projected screens, hand held devices, imaging systems having limited bandwidth, and other image processing systems. Moreover, in a graphics environment, the present invention may be used in conjunction with the simplification techniques as described in U.S. Pat. No. 5,448,686 to P. Borrel et al., hereinafter incorporated by reference in its entirety, to provide a satisfactory level of detail of the displayed image while decreasing the computational burden of the rendering operation on the system.

Although the invention has been shown and described with respect to the particular embodiments thereof, it should be understood by those skilled in the art that the foregoing and various other changes, omissions, and additions in the form and detail thereof may be made without departing from the spirit and scope of the invention.

I claim:

1. In a graphics system wherein three-dimensional objects are represented by primitives, a method for generating pixel data that represents a view of the primitives CHARACTERIZED IN THAT said view is organized into portions representing successive co-centric subsets of said view, and a memory is partitioned into subsets corresponding to said portions of said view, the method comprising the steps of:

rendering said primitives to generate image data that represents contribution of said primitives to each portion of said view and storing said image data in the corresponding subset of said memory, wherein resolution of said image data representing said one of said portions is different from resolution of said image data representing said another of said portions; and expanding said image data that is stored in at least one subset of said memory to generate expanded image data, wherein said pixel data representing said view is generated according to said expanded image data, wherein the rendering step includes the substeps of:

rasterizing data defining a given primitive to generate image data that represents contribution of the given primitive to a particular portion of said view, concurrent with the rasterizing substep, scaling said data defining the given primitive and clipping the scaled data against a clipping volume that corresponds to a portion of said view different from the particular portion of said view, wherein the clipped data is used in a subsequent rasterizing substep.

2. The method of claim 1, wherein said expanding step expands said image data that is stored in more than one subset of said memory.

3. The method of claim 2, wherein said expanding step expands said image data that is stored in more than one subset of said memory in one pass.

4. The method of claim 1, further comprising the step of superimposing expanded image data derived from one subset of said memory onto expanded image data derived from another subset of said memory to generate superimposed expanded image data, and wherein said pixel data representing said view is generated according to said superimposed expanded image data.

5. The method of claim 1, wherein resolution of said image data representing portions at the center of said view is higher than resolution of said image data representing portions at the periphery of said view.

6. The method of claim 1, said view may be organized into a variable number of portions.

7. The method of claim 6, wherein said variable number of portions is controlled by user input.

8. The method of claim 1, wherein at least one of said portions has a variable size.

9. The method of claim 8, wherein said variable size is controlled by user input.

10. The method of claim 1, wherein said primitives are defined by coordinates of vertices, and wherein the scaling step scales the coordinates of the vertices that define the given primitive in x and y.

11. In a graphics system wherein three-dimensional objects are represented by primitives, an apparatus for generating pixel data that represents a view of the primitives CHARACTERIZED IN THAT said view is organized into portions representing successive co-centric subsets of said view, and a memory is partitioned into subsets corresponding to said portions of said view, the apparatus comprising:

a rendering engine, coupled to said memory, for rendering said primitives to generate image data that represents contribution of said primitives to each portion of said view and for storing said image data in the corresponding subset of said memory, wherein resolution of said image data representing said one of said portions is different from resolution of said image data representing said another of said portions; and expansion logic, coupled to said memory, for expanding said image data that is stored in at least one subset of said memory to generate expanded image data, wherein said pixel data representing said view is generated according to said expanded image data;

wherein said rendering engine includes:
a rasterization stage for rasterizing data defining a given primitive to generate image data that represents contribution of the given primitive to a particular portion of said view, means, coupled to said rasterization stage, for scaling said data defining the given primitive and clipping the scaled data against a clipping volume that corresponds to a portion of said view different from the particular portion of said view, wherein said scaling and clipping operation are performed concurrently with the rasterization operation performed by said rasterization stage, and wherein the clipped data is output to said rasterization stage for subsequent rasterization.

12. The apparatus of claim 11, wherein said expansion logic expands said image data that is stored in more than one subset of said memory.

13. The apparatus of claim 12, wherein said expansion logic expands said image data that is stored in more than one subset of said memory in one pass.

14. The apparatus of claim 12, wherein said expansion logic superimposes expanded image data derived from one subset of said memory onto expanded image data derived from another subset of said memory to generate superimposed expanded image data, and wherein said pixel data representing said view is generated according to said superimposed expanded image data.

15. The apparatus of claim 11, wherein resolution of said image data representing portions at the center of said view is higher than resolution of said image data representing portions at the periphery of said view.

16. The apparatus of claim 11, wherein said primitives are defined by coordinates of vertices, and wherein said scaling logic scales the coordinates of the vertices that define the given primitive in x and y.

17. The apparatus of claim 11, wherein said view may be organized into a variable number of portions.

18. The apparatus of claim 17, wherein said variable number of portions is controlled by user input.

19. The apparatus of claim 11, wherein at least one of said portions has a variable size.

20. The apparatus of claim 19, wherein said variable size is controlled by user input.

* * * * *